US011039712B2

(12) United States Patent
Egli et al.

(10) Patent No.: US 11,039,712 B2
(45) Date of Patent: Jun. 22, 2021

(54) BEVERAGE MACHINE, IN PARTICULAR COFFEE MACHINE, AND METHOD FOR OPERATING SUCH A BEVERAGE MACHINE

(71) Applicant: Schaerer AG, Zuchwil (CH)

(72) Inventors: Peter Egli, Münchenbuchsee (CH); Bruno Aeberhard, Zuchwil (CH); André Lüssi, Jengenstorf (CH)

(73) Assignee: SCHAERER AG, Zuchwil (CH)

( * ) Notice: Subject to any disclaimer, the term of this patent is extended or adjusted under 35 U.S.C. 154(b) by 274 days.

(21) Appl. No.: 15/513,330

(22) PCT Filed: Aug. 18, 2015

(86) PCT No.: PCT/EP2015/068948
§ 371 (c)(1),
(2) Date: Mar. 22, 2017

(87) PCT Pub. No.: WO2016/045878
PCT Pub. Date: Mar. 31, 2016

(65) Prior Publication Data
US 2017/0295991 A1    Oct. 19, 2017

(30) Foreign Application Priority Data

Sep. 23, 2014    (CH) ...................... 01439/14

(51) Int. Cl.
*A47J 31/44*    (2006.01)
*A47J 31/40*    (2006.01)
(Continued)

(52) U.S. Cl.
CPC ............. *A47J 31/4492* (2013.01); *A23F 5/26* (2013.01); *A47J 31/407* (2013.01); *A47J 31/60* (2013.01); *B65D 85/8043* (2013.01)

(58) Field of Classification Search
CPC ........ A47J 31/60; A47J 31/605; A47J 31/407; A47J 31/3623; A47J 31/3676; B65D 85/8043
(Continued)

(56) References Cited

U.S. PATENT DOCUMENTS 4,889,041 A * 12/1989 Mahlich .............. A47J 31/0573
99/285
4,969,393 A * 11/1990 Chr. Mahlick ...... A47J 31/0573
38/77.8
(Continued)

FOREIGN PATENT DOCUMENTS

CH           665945 A5     6/1988
DE  10 2006 047 969 A1    4/2008
(Continued)

OTHER PUBLICATIONS

Stephen Lower (Jul. 2007). "Hard water and water softening". Reference dated Oct. 8, 2007. (Year: 2007).*
(Continued)

*Primary Examiner* — Robert J Utama
*Assistant Examiner* — Lawrence H Samuels
(74) *Attorney, Agent, or Firm* — Pearne & Gordon LLP

(57) ABSTRACT

A beverage machine, in particular a coffee machine, prepares a beverage using water supplied via a fixed water connection to a hydraulic part arranged in the beverage machine and outputs the beverage at an outlet of the beverage machine. Maintenance is simplified by the fact that the beverage machine is provided with a cartridge holder which is accessible from the outside and into which a cartridge can be inserted in an exchangeable manner, the cartridge includes a cartridge connection on the inlet side and a cartridge connection on the outlet side, via which, in the inserted state of the cartridge, water supplied to the beverage
(Continued)

machine via the fixed water connection flows through the cartridge and is thereby filtered and/or enriched with additives.

23 Claims, 4 Drawing Sheets

(51) Int. Cl.
*B65D 85/804* (2006.01)
*A47J 31/60* (2006.01)
*A23F 5/26* (2006.01)

(58) Field of Classification Search
USPC .......................................... 99/284, 290, 295
See application file for complete search history.

(56) References Cited

U.S. PATENT DOCUMENTS

| | | | |
|---|---|---|---|
| 5,393,548 A | 2/1995 | Heiligman | |
| 5,860,354 A * | 1/1999 | Jouatel | A47J 31/605 99/286 |
| 6,158,328 A * | 12/2000 | Cai | A47J 31/4485 261/DIG. 76 |
| 7,722,766 B2 * | 5/2010 | Namur | A47J 31/605 210/172.3 |
| 8,833,238 B2 * | 9/2014 | Hansen | A47J 31/3695 99/283 |
| 8,846,121 B2 * | 9/2014 | Hansen | A47J 31/0621 426/232 |
| 9,023,205 B2 * | 5/2015 | Namur | A47J 31/605 210/282 |
| 9,320,385 B2 * | 4/2016 | Spiegel | A47J 31/3623 |
| 9,370,271 B2 * | 6/2016 | Tembaak | B08B 9/032 |
| 9,521,921 B2 * | 12/2016 | Joseph | A47J 31/368 |
| 9,808,112 B2 * | 11/2017 | Favero | A47J 31/3623 |
| 10,206,534 B2 * | 2/2019 | Favero | A47J 31/3638 |
| 2002/0078831 A1 * | 6/2002 | Cai | A47J 31/14 99/295 |
| 2007/0267098 A1 | 11/2007 | Ozanne et al. | |
| 2007/0289913 A1 * | 12/2007 | Namur | A47J 31/605 210/260 |
| 2008/0121111 A1 * | 5/2008 | Paget | A47J 31/0668 99/295 |
| 2008/0121581 A1 * | 5/2008 | Namur | A47J 31/605 210/282 |
| 2009/0057341 A1 * | 3/2009 | Girard | A47J 31/402 222/129.1 |
| 2011/0030732 A1 * | 2/2011 | Boussemart | A47J 31/60 134/18 |
| 2012/0107453 A1 * | 5/2012 | Chase | F25D 23/126 426/66 |
| 2012/0121780 A1 * | 5/2012 | Lai | A47J 31/3623 426/433 |
| 2012/0156336 A1 * | 6/2012 | Hansen | A47J 31/0621 426/231 |
| 2013/0068109 A1 | 3/2013 | Pribus et al. | |
| 2013/0129872 A1 | 5/2013 | Krüger | |
| 2013/0164418 A1 * | 6/2013 | Hansen | A47J 31/0621 426/232 |
| 2013/0224347 A1 * | 8/2013 | Favero | A47J 31/3623 426/231 |
| 2013/0276635 A1 * | 10/2013 | Favero | A47J 31/3638 99/283 |
| 2013/0312619 A1 * | 11/2013 | Spiegel | A47J 31/3623 99/295 |
| 2014/0060338 A1 * | 3/2014 | Tembaak | A47J 31/60 99/300 |
| 2014/0197193 A1 * | 7/2014 | Wallerstorfer | A47J 31/60 222/23 |
| 2014/0251891 A1 * | 9/2014 | Rickenbach | C02F 1/001 210/282 |
| 2014/0314921 A1 * | 10/2014 | Kuempel | A47J 31/525 426/231 |
| 2015/0289708 A1 * | 10/2015 | Ezaz-Nikpay | A47J 31/407 426/115 |
| 2015/0344285 A1 * | 12/2015 | Joseph | B65D 85/8043 222/173 |
| 2016/0302613 A1 * | 10/2016 | Cross | A47J 31/4492 |
| 2018/0325309 A1 * | 11/2018 | Short | A47J 31/3633 |

FOREIGN PATENT DOCUMENTS

| | | | | |
|---|---|---|---|---|
| DE | 10 2007 019425 A1 | 10/2008 | | |
| DE | 10 2011 081010 A1 | 2/2013 | | |
| DE | 102011081010 A1 * | 2/2013 | ............. | A47J 31/60 |
| EP | 2 020 197 A1 | 2/2009 | | |
| EP | 2 078 481 A1 | 7/2009 | | |
| EP | 2 671 480 A2 | 12/2013 | | |
| EP | 2 705 783 A1 | 3/2014 | | |
| EP | 2 705 784 A1 | 3/2014 | | |
| FR | 2 873 011 A1 | 1/2006 | | |
| GB | 2 469 873 A | 11/2010 | | |
| GB | 2 506 940 A | 4/2014 | | |
| JP | 2009-508547 A | 3/2009 | | |
| JP | 2012-517257 A | 8/2012 | | |
| JP | 2013-536017 A | 9/2013 | | |
| WO | 2006/090183 A2 | 8/2006 | | |
| WO | 2007/039032 A2 | 4/2007 | | |
| WO | 2007/134956 A1 | 11/2007 | | |
| WO | 2009/124786 A1 | 10/2009 | | |
| WO | 2010/125329 A1 | 11/2010 | | |
| WO | 2012/010317 A1 | 1/2012 | | |
| WO | 2012/019902 A1 | 2/2012 | | |
| WO | 2012/035247 A1 | 3/2012 | | |
| WO | 2012/048728 A1 | 4/2012 | | |
| WO | 2013/023963 A1 | 2/2013 | | |
| WO | 2013/057071 A1 | 4/2013 | | |
| WO | 2013/087474 A1 | 6/2013 | | |

OTHER PUBLICATIONS

"Alref Bertsch Espresso Point"; URL:http://web.archive.org/web/20130217140413/http://www.lavazza-point.de/sites/epprodukte.php?id=3&PHPSESSID=h9apclqc25uOsis27laidp7bv4; Dated Feb. 17, 2013.

International Search Report from Corresponding Application No. PCT/EP2015/068948; dated Oct. 26, 2015.

International Preliminary Report on Patentability from Corresponding Application No. PCT/EP2015/068948; dated Mar. 31, 2016.

Notice of Reasons for Refusal dated Aug. 6, 2019 for corresponding Japanese Application No. 2017-516042 and English translation.

* cited by examiner a)

b)

BEVERAGE MACHINE, IN PARTICULAR COFFEE MACHINE, AND METHOD FOR OPERATING SUCH A BEVERAGE MACHINE

TECHNICAL FIELD

The present invention relates to the field of beverage machines, in particular coffee machines. It relates to a beverage machine according to the preamble of claim 1. It also relates to a method for operating such a beverage machine.

PRIOR ART

One of the main problems encountered with fully automatic coffee machines is lime. First, this is responsible for a variety of problems; second, the decalcification processes are often so complicated that only well-trained personnel can carry them out. In most cases, it is even necessary to use service technicians who must travel to the location specifically for this purpose or who perform the decalcification regularly as part of normal service. Since decalcification often takes a long time, the result is waiting times during which the machines to be decalcified cannot be used.

In the case of machines equipped with a fixed water connection in particular, the calcification process is often complicated or there may actually be none at all because it is often necessary to decalcify boilers and valves individually or even to replace them in these cases.

Various types of cleaning and/or decalcification of coffee machines have already been described in the prior art.

CH 665945 A5 presents a coffee machine design, such that reliable and rapid cleaning of the portions of the coffee machine to be cleaned is possible. To do so, the hot water inlet to the brewing chamber can optionally be connected to the hot water source or to a supply tank for a liquid cleaning agent.

If the brewing chamber is to be cleaned, it is connected to the supply tank for the liquid cleaning agent, which must be odor-free, food-safe and a fat solvent without leaving an aftertaste. Nevertheless, the cleaning agent should also have a certain lubrication capacity. The cleaning agent is responsible for dissolving any residues that have been formed on the walls and in particular on the micro-screen in the brewing chamber to be dissolved. Next, the brewing chamber is connected to the hot water source again wherein the dissolved residues and the cleaning agent residues are flushed out by repeatedly rinsing out the brewing chamber.

The supply tank is expediently connected by means of a three-way valve to the hot water line downstream from the outlet of the hot water valve that forms the hot water source. By simply switching the three-way valve, the brewing chamber can be connected optionally to the supply tank for the cleaning agent or to the hot water source, wherein cutting off the hot water valve ensures that the cleaning agent cannot enter the hot water circulation inside the coffee machine or the hot water cannot flow into the storage tank for the cleaning agent.

DE 10 2006 047 969 A1 discloses a device for preparing and dispensing beverages with a unit for initiating and carrying out a cleaning process consisting of at least one line, which serves to transport the beverage to a beverage dispenser and means for supplying a cleaning agent for at least partial cleaning of the one line and means for detecting the dosage of the cleaning agent, wherein the means for detecting the dosage comprise means for measuring the pH. The means for supplying the cleaning agent include a mixing tank for preparation of a cleaning medium. The means for detecting the dosage of the cleaning agent are arranged in the mixing tank and/or downstream from the mixing tank, while the mixing tank itself is arranged so that it is replaceable.

EP 2 078 481 A1 describes a cleaning module for machines for preparing liquid foods, in particular for coffee machines, comprising at least one cleaning agent tank for holding a cleaning agent, at least one dosing device with a control connection and at least one dispensing chamber, wherein the dosing device is connected to the cleaning tank and to the dispensing chamber in such a way that the cleaning agent can be conveyed by means of the dosing device out of the cleaning agent tank and into the dispensing chamber. The cleaning agent tank, the dosing device and the dispensing chamber form a structural unit and are arranged in particular in a common housing. The housing has a carrying handle arranged on the top side. The cleaning module is preferably designed as an insert module wherein at least one handle for insertion and extraction of the cleaning module is formed on the front side of the cleaning module.

WO 2009124786 A1 discloses a device for preparing beverages, comprising a hydraulic circulation, which includes a water tank, a water pump, a heating device arranged in the circulation for heating the water circulating therein and a beverage preparation module, all these modules being interconnected in such a way that water can flow out of the water tank and into the beverage preparation module. A decalcification system is arranged in the circulation downstream from the water tank, with a special holding space for holding a predetermined dose of a soluble and floatable decalcification agent and a water inlet and a water outlet to allow water to flow through the holding space.

WO 2012035247 A1 describes a storage device for a self-cleaning coffee machine, comprising a frame with a removable carrier and means for fastening a tank for a cleaning fluid, wherein the carrier has means for removal of the cleaning fluid and can be moved back and forth between a storage position in which it is visibly integrated into the machine and an extracted position in which the tank can be connected to the carrier or can be removed from the carrier.

WO 2013023963 A1 discloses a beverage dispenser having a mechanical coupling device for a cartridge with cleaning agent. The coupling device establishes a repeatable relative position of the cartridge which is always the same with respect to the beverage dispenser. It ensures that the cartridge as a tank for the cleaning agent and for decalcification agent will always assume the same position relative to the device. Mechanical components of the coupling device create a reliable and stable coupling that cannot be released inadvertently between the beverage dispenser and the cartridge by means of a screw closure, a bayonet closure, a click closure or a lock closure, for example.

This approach differs from the approach in which the user allows the cleaning agent to be added in a dose and/or amount that can hardly be controlled and verified. If the cleaning agent is added in the form of a tablet, then the same dose and/or amount can always be assumed, but if the user must add a liquid or powdered cleaning agent, for example, then there is no assurance that the user will add it completely. Furthermore, it is impossible to reliably assume that the user will select the correct agent. The approach described here therefore follows the principle of ensuring and/or compelling the addition of a cleaning agent, the type and amount of which are precisely defined, with a coupling device for a rigid mechanical coupling between the beverage dispenser and the cartridge. This makes it possible not only to carry out a much more precisely defined cleaning and/or decalcification process and instead it also makes it possible to introduce the cleaning agent in a targeted manner at the location where there is also a demand for cleaning and/or decalcification.

However the coupling also includes mechanical coupling between a drive arranged in the beverage dispenser and a pump arranged in the cartridge. The system and the cartridge are therefore extremely complex and mechanically complicated.

WO 2013057071 A1 describes a coffee machine, in particular a fully automatic coffee machine comprising a water tank, a heating device for heating device for heating water, a hot water unit for steeping ground coffee beans in water heated by the heating device, a water line system comprising at least one water line and a delivery pump for delivering water from the water tank through the water line system. A chamber is or can be provided for an active chemical substance, in particular a decalcification agent and/or cleaning agent, said chamber being connected and/or connectable manually or automatically to the water line system in such a way that water can be conveyed out of the water tank and through the chamber into the water line system by means of the delivery pump. In particular, the chamber is fixedly integrated into the coffee machine or, as alternative, can be removed as a tank, in particular being replaceable or arranged, so that it is adjustable between two positions.

EXPLANATION OF THE INVENTION

One object of the present invention is therefore to provide a beverage machine that can be adapted in a particularly easy and user-friendly manner to on-site water quality levels, in particular permitting decalcification.

Another object of the invention is to provide a simplified method for operating such a beverage machine.

These and other objects are achieved through the features of claims 1 and 17.

The invention is directed to a beverage machine, in particular a coffee machine which prepares a beverage with a supply of water through a fixed water connection to a hydraulic part arranged in the beverage machine and output at an outlet on the beverage machine. The invention is characterized in that a cartridge holder that is accessible from the outside is provided on the beverage machine, so that a cartridge can be inserted replaceably into this cartridge holder, said cartridge having a cartridge connection on the inlet end and a cartridge connection on the outlet end, by means of which water supplied through the fixed water connection to the beverage machine when the cartridge has been inserted then flows through the cartridge and is thereby filtered and/or enriched with additives.

According to one embodiment of the invention, the cartridge holder is arranged on the front side of the beverage machine.

Another embodiment of the invention is characterized in that a water pump is provided in the beverage machine between the fixed water connection and the hydraulic part, and the cartridge holder is designed so that water flows through the cartridge when the latter has been inserted, said water being pumped to the hydraulic part by the water pump.

Another embodiment of the invention is characterized in that the cartridge holder comprises a switching device, which connects the fixed water connection hydraulically to the hydraulic parts when the cartridge is not inserted, and when the cartridge is inserted, the switching device causes the water to be diverted partially or entirely through the cartridge.

Again, another embodiment of the invention is characterized in that cartridges of various functions and/or sizes can be inserted into the cartridge holder.

In particular, the cartridges may be provided with a coding element, which is characteristic of the respective functionality and size of the cartridge.

In particular, the coding elements can be designed to be readable and/or outputtable by mechanical, optical, high-frequency or magnetic means. In general, detection of the fact that a cartridge is present and/or what type of cartridge is present can be detected mechanically by means of pins on the cartridge or by means of one or more microswitches on the machine, for example.

Specifically, the coding elements may be embodied as RFIDs.

However, it is also conceivable for the coding elements to have a one- or two-dimensional optical code.

In particular, means for reading and/or output of the coding elements provided on the cartridges may be provided on the beverage machine, and the means for reading and/or output of the coding elements applied to the cartridges may be connected to a control unit of the beverage machine. Depending on the cartridge, the machine then performs various functions. For example, the machine detects whether it is a cartridge for an annual decalcification or for a monthly decalcification. The machine could also detect whether the cartridge is filled with decalcifying agent, for example, or whether it is already empty. In addition, the machine could detect whether it is a decalcification cartridge or a filter.

Specifically, the means for reading and/or output of the coding elements applied to the cartridges may be arranged on the cartridge holder.

Another embodiment of the invention is characterized in that the cartridges are designed as decalcification cartridges and have an interior space, in which the decalcifying agent is accommodated.

However, the cartridges may also be designed as filter cartridges and may have an interior space, in which a filter for the water flowing through it is accommodated.

Another embodiment of the invention is characterized in that a switching element arranged in the cartridge holder is connected to a control unit of the beverage machine and is activated automatically when a cartridge is inserted.

Another embodiment of the invention is characterized in that the cartridges can be inserted into the cartridge holder in such a way that they can be locked or snapped into place there.

Another embodiment of the invention is characterized in that means for monitoring the water quality are provided and are connected to a control unit of the beverage machine.

The method according to the invention for operating a beverage machine according to the invention is characterized in that, when a cartridge is inserted into the cartridge holder, water coming from the fixed water connection is diverted automatically partially or entirely into the cartridge, and when the cartridge is removed, the diversion is automatically reversed.

One embodiment of the method according to the invention is characterized in that insertion of a cartridge into the cartridge holder of a control unit of the beverage machine is signaled, and the inserted cartridge is displayed visually on the beverage machine.

In particular the type of cartridge inserted can be detected automatically and a decalcification program can be initiated and carried out automatically if the cartridge inserted is a decalcification cartridge.

Another embodiment of the method according to the invention is characterized in that the calcification status of the hydraulic part is monitored continuously, and there is a display on the beverage machine indicating when a decalcification program is necessary and/or a decalcification cartridge is to be inserted into the cartridge holder.

Another embodiment of the method according to the invention is characterized in that, during normal operation of the beverage machine, a filter cartridge is inserted into the cartridge holder, and the filter cartridge is replaced by a decalcification cartridge when there is a need for decalcification.

A particularly suitable cartridge for a beverage machine according to the invention is characterized in that the cartridge is provided with a non-return valve on both the inlet end and the outlet end, such that these valves can be opened for carrying out a decalcification process.

In particular the non-return valve on the inlet end can be opened hydraulically by the water applied at the inlet end.

The non-return valve at the outlet end can be opened hydraulically by the water flowing through the cartridge.

However, it is also conceivable for the non-return valve on the outlet end to be openable mechanically by an actuating element intervening from the outside.

BRIEF DESCRIPTION OF THE FIGURES

The invention will be described in greater detail below on the basis of exemplary embodiments in conjunction with the drawings, in which.

MEANS OF IMPLEMENTING THE INVENTION

Figure 1:
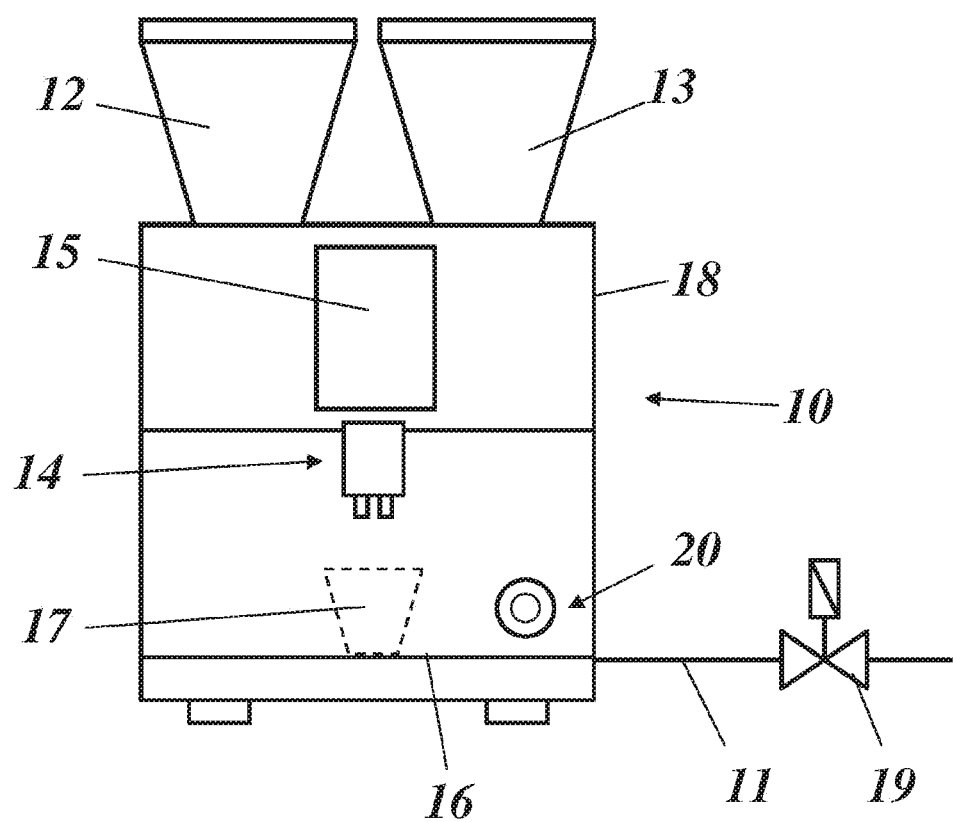
FIG. 1 shows a front view of a schematic diagram of an exemplary coffee machine with a cartridge holder arranged on the front side according to one exemplary embodiment of the invention.

FIG. 1 shows, in a front view, a schematic diagram of an exemplary coffee machine 10 with a fixed water connection 11 according to one exemplary embodiment of the invention. The coffee machine 10 is accommodated in the housing 18. Funnel-shaped coffee bean containers 12, 13, which are filled with coffee beans for the milling mechanism underneath them, are arranged on the housing 18 at the top.

However, it is also possible for the coffee machine to be operated instead with loose coffee grounds or with powdered coffee packaged in capsules.

An operating/display unit 15, usually as a combined unit is provided on the front side of the housing 18 and can be used for input of control commands and beverage requests by means of keys or a touch screen (not shown) and on which certain states and sequences of the machine are visualized. Below the operating and display unit 15, there is an outlet 14 through which the selected beverage and optional additives such as milk, foamed milk or a flavoring additive (syrup) can be dispensed into a container (cup) 17 standing beneath it on a standing surface 16. Additional devices (not shown in FIG. 1) that dispense milk in cooled form or various types of flavoring additives can be supplied to the coffee machine 10 for supplying the additives.

In this example, a cartridge holder 20, in which a cartridge for decalcifying the machine or for filtering the water can be inserted, is also arranged on the front side of the housing 18. A main water valve 19 is usually arranged in the fixed water connection 11, through which said water is supplied to the coffee machine 10. Arranging the cartridge holder 20 on the front side has the advantage that additional modules for milk and/or flavoring additives or cup heaters or the like can be placed on both sides of the machine, without hindering or impeding the access to the cartridge holder 20.

Figure 2:
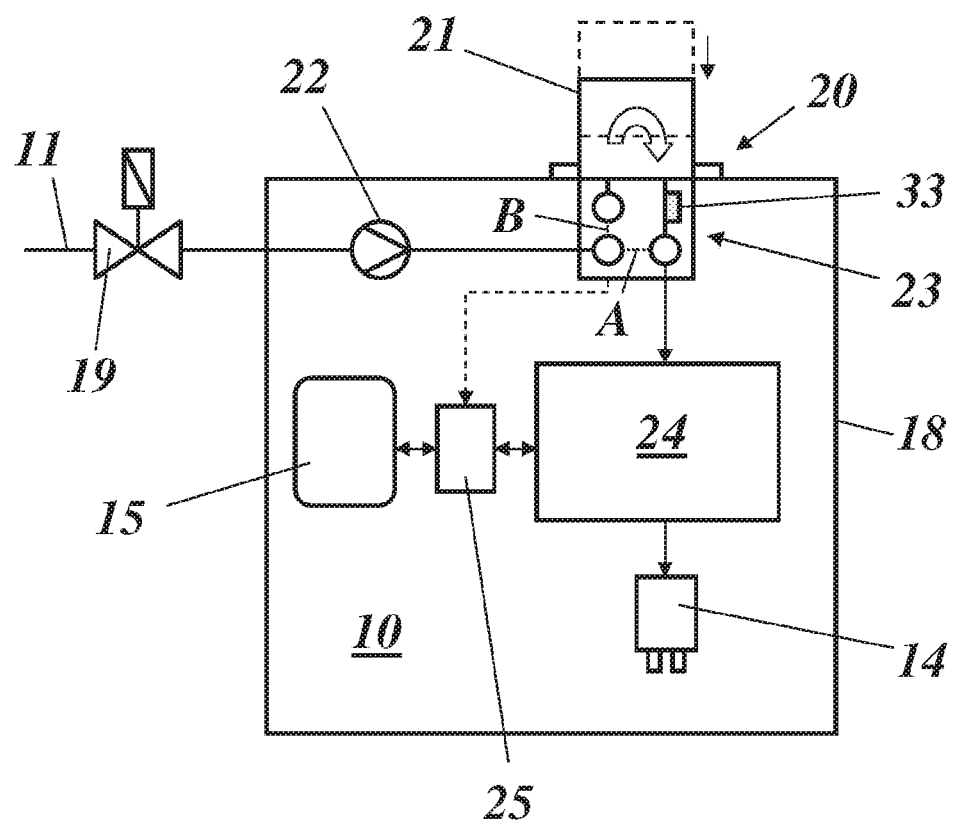
FIG. 2 shows a greatly simplified scheme of the internal structure of a beverage machine according to one exemplary embodiment of the invention.

A decalcifying agent (EM in FIG. 3) is provided for decalcification and is supplied in a type of cartridge—as mentioned above. This cartridge (21 in FIG. 2, 21a in FIG. 3, 21b in FIG. 4) is designed, so that it has an inlet channel and an outlet channel (similar to those with a water filter), which are accessible according to FIGS. 3 and 4 by means of a cartridge connection 27 on the inlet end and a cartridge connection 28 on the outlet end.

Figure 3:
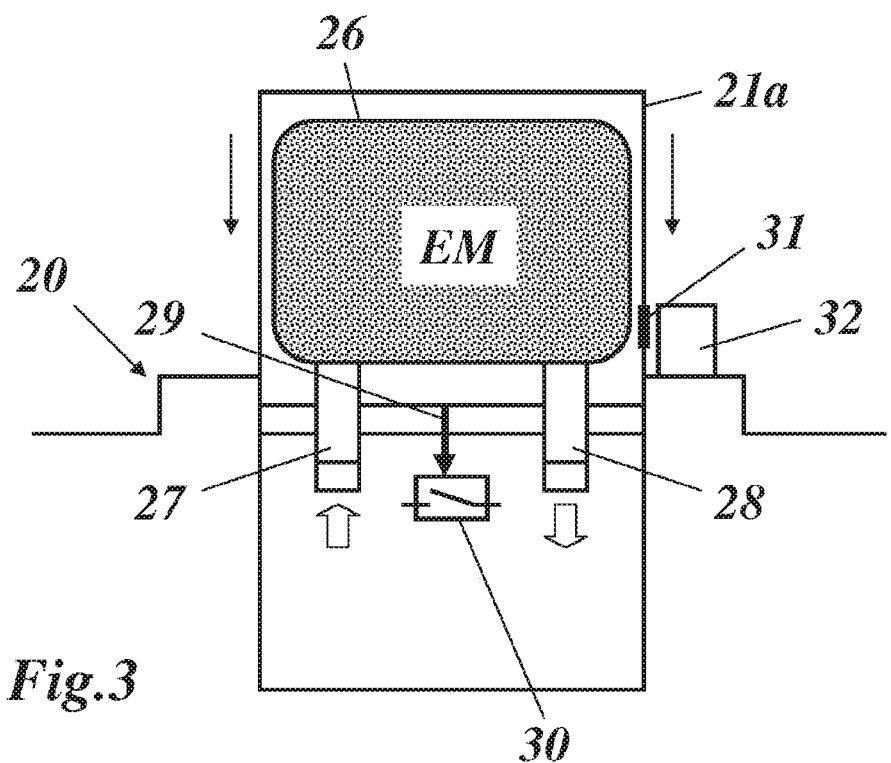
FIG. 3 shows an exemplary scheme for insertion of a decalcification cartridge in a beverage machine according to another exemplary embodiment of the invention.
Figure 4:
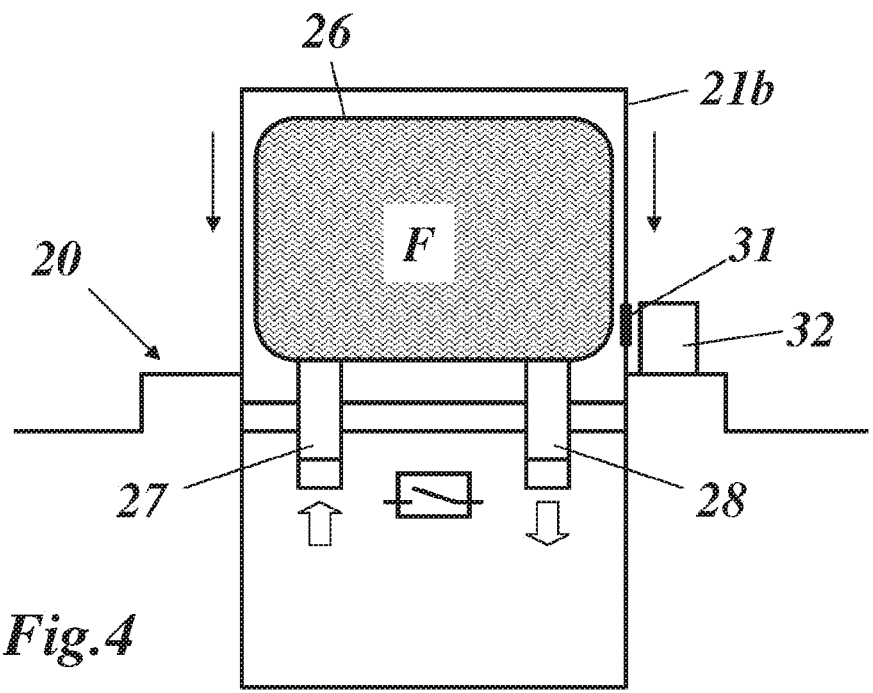
FIG. 4 shows a diagram comparable to that in FIG. 3 for the insertion of a filter cartridge.

According to FIG. 3, a decalcifying agent EM is present in the interior space 26 of the decalcification cartridge 21. The decalcifying agent EM may thus be in liquid form, in powdered form or in tablet form. The decalcification cartridge 21a (as well as the filter cartridge 21b in FIG. 4) is preferably designed so that it can be connected in a water-tight connection to the machine by means of a type of thread or a similar quick-acting closure (bayonet closure or a locking plug closure). The cartridge connections 27 and 28 may be designed to be male-type connections (such as those in FIGS. 3 and 4) or female-type connections. They may be arranged side by side (as shown in FIGS. 3 and 4) or concentrically inside of one another in order to make it easier to screw in the cartridge.

The coffee machine 10 has the cartridge holder 20 as an interface, which is easily accessible from the front and with which this cartridge can be screwed in, i.e., connected. The cartridge holder 20 is inserted into the water path, which, according to FIG. 2, leads from the fixed water connection 11 to a hydraulic part 24 of the beverage machine 10 by way of a water pump 22. The outlet 14 for dispensing the finished beverage is connected to the hydraulic part 24. The cartridge holder 20 has a switching device 23, which can switch between a direct hydraulic connection between the water pump 22 and the hydraulic part 24 via path A and a bypass line for water through the cartridge 21 via path B. The switching device 23 may have a purely mechanical function but may also be equipped with controllable valves that open and close in a certain order.

When the cartridge 21 and/or 21a, b (screwing it in) is/are inserted, first, the cartridge, i.e., access to the interior space 26, is open and, second, the water path is redirected entirely or partially through the cartridge. This is indicated by the block arrow in the cartridge 21 in FIG. 2. For complete rerouting, the direct connection A is interrupted and the rerouted path B is activated.

For decalcification, the cartridge 21a is introduced into the water circulation immediately downstream from the water pump 22, as already explained, so that all the following elements, in particular the hydraulic part 24, such as the boilers, valves, lines, etc., are flushed with the decalcifying agent EM. The cartridge 21a is designed so that the water forced by the water pump 22 into the cartridge 21a reliably forces the decalcifying agent (decalcification liquid) out of the cartridge 21a. When the cartridge 21a and the coffee machine 10 are connected, the decalcification procedure is started automatically. This may take place by the fact that, according to FIG. 3, a switching element 30 in the form of a microswitch or a reed element, for example, is arranged in the cartridge holder 20 in such a way that said switching element is activated mechanically by an actuating element 29 (microswitch) or is switched by means of a magnet on the cartridge (reed element) when the cartridge 21 and/or 21a, b is inserted. The switching element 30 may be connected to the controller 25 of the coffee machine 10 by means of a line (indicated with dotted lines) according to FIG. 2, and the controller 25 may be prompted directly to initiate and carry out a preprogrammed decalcification procedure if a decalcifying cartridge 21a has been inserted into the cartridge holder 20.

The size of the cartridge 21, 21a, b may be designed in various ways so that even more frequent decalcification using less decalcifying agent EM is also possible. At any rate the size of the cartridge also depends on the number of boilers present in the hydraulic part 24. It would also be conceivable for the cartridges 21, 21a, b to be furnished with a coding system, for example, a simple color code or a coding element 31 in the form of an RFID or a (one-dimensional) barcode or a (two-dimensional) QR code or the like, which is applied to the cartridge 21, 21a, b, so that the machine can recognize which cartridge is installed. In particular coding elements 31 applied to the cartridge 21, 21a, b can be read or output by a query device 32 arranged directly on the cartridge holder 20, for example (FIGS. 3, 4), and can access the coding element 31 either visually, by means of high-frequency technology or magnetically.

The coding may thus be used to ensure that the suitable cartridge intended for the desired purpose is used as well as that (for example in the case of the RFID variant) a cartridge 21, 21a, b is used only once. It is also conceivable for the coffee machine 10 to detect by means of additional sensor systems in its control unit 25 when decalcification is necessary and to notify the user of this automatically. This could be measured for example on the basis of the steepness of the temperature rise T(t) when heating a boiler in the hydraulic part 24, wherein the heating curve is steeper, the lower the amount of calcification of the installed heating coils.

Instead of the decalcification cartridge 21a in FIG. 3, the interface and/or cartridge holder 20 may also be used for connection and/or insertion of a water filter in the form of a filter cartridge 21b (FIG. 4). In its interior space 26, the filter cartridge 21b has a filter F, which filters out and retains particles or foreign substances such as sand, rust or the like that have been conveyed with the water.

The filter cartridge 21b may be permanently installed in the cartridge holder 20 in particular for normal operation of the coffee machine 10 and may be replaced by a decalcification cartridge 21a only for passing through a decalcification program temporarily.

The interface for connecting the cartridge, the cartridge holder 20 may additionally be equipped with a pH sensor 33 (FIG. 2), by means of which it is possible to ascertain whether or not the filter F in the upstream filter cartridge 21b is at the end of its lifetime and/or is controlled continuously based on the lime content of the water and a calculation is performed with the help of this information in the control unit 25 to ascertain when decalcification will be necessary.

The control unit 25 controls the controllable elements in the hydraulic part 24, on the one hand, and receives return messages about temperatures, pressures, positions of the mechanical components in the hot water part, etc., from there. On the other hand, the control unit 25 is connected to the operating/display unit 15, receiving control commands form there and/or bringing information for display there. These include information about the type of cartridges used, the need for replacing the cartridge, the need for decalcification and the various phases of the decalcification program.

The insertion of a cartridge 21, 21a, b into the cartridge holder 20 is thus signaled to the control unit 25 of the coffee machine and the cartridge 21, 21a, b inserted there is displayed visually. Since the type of cartridge 21, 21a, b used is detected automatically, a decalcification program is initiated automatically and carried out when the cartridge that has been inserted is a decalcification cartridge 21a.

Figure 5:
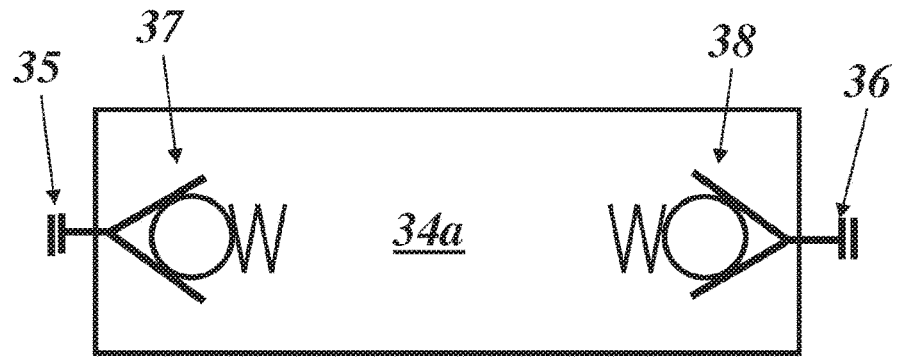
FIG. 5 shows a cartridge equipped with counter-current non-return valves for a beverage machine according to the invention (FIG. 5a), which can be opened hydraulically at the inlet end and mechanically at the outlet end (FIG. 5b)
Figure 6:
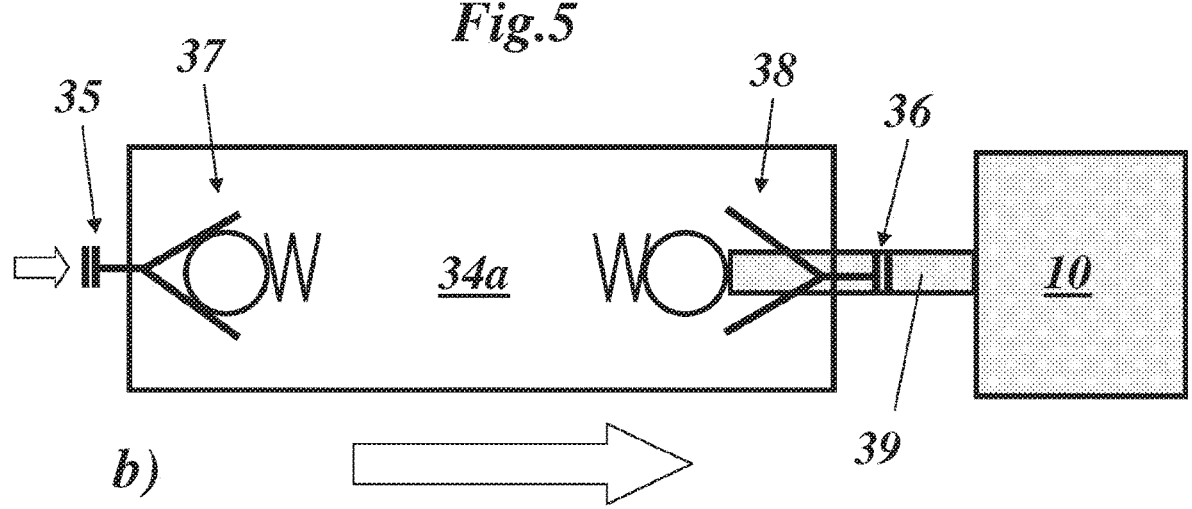
FIG. 6 shows a cartridge equipped with co-current non-return valves for a beverage machine according to the invention, which can be opened hydraulically at the inlet end and at the outlet end on insertion.
Figure 6:
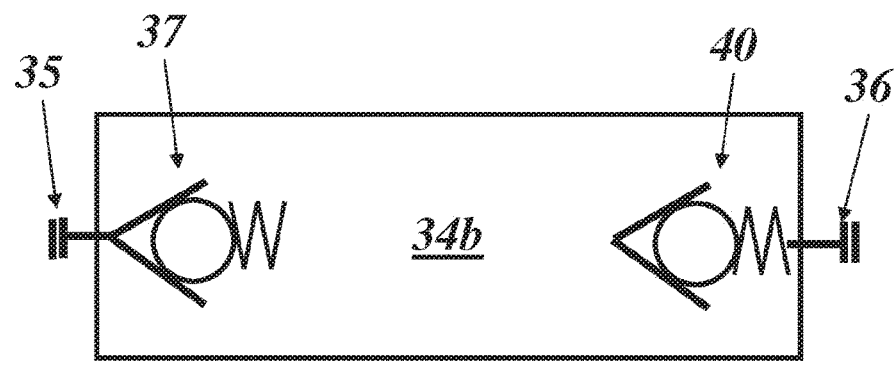

Other embodiments of the cartridges are indicated schematically in FIGS. 5 and 6. FIG. 5 shows a cartridge 34a for a beverage machine according to the invention (FIG. 5a) equipped with countercurrent non-return valves 37 and 38 and the cartridge connections 35 (inlet end) and 36 (outlet end). If the cartridge 34a is inserted into the holder provided for this purpose in the beverage machine 10 (FIG. 5b), then the non-return valve 37 on the inlet end is opened hydraulically (by the water pressure, left arrow), while the non-return valve 38 on the outlet end is opened mechanically by an actuating element 39 when inserted into the machine. The decalcifying agent in the cartridge 34a is ejected from the cartridge 34a with water (arrow at the bottom). At the end of the process, water remains behind in the cartridge 34a.

FIG. 6 shows a cartridge 34b for a beverage machine according to the invention, equipped with co-rotational non-return valves 37 and 40. The non-return valves 37 and 40 are opened hydraulically on both the input end and the output end. The cartridge 34b (as well as the cartridge 34a) is (are) sealed by the spring load of the valves. The decalcifying agent is ejected here again with water from the cartridge 34b so that at the end of the process water remains behind in the cartridge.

LIST OF REFERENCE NUMERALS

10 Coffee machine
11 Fixed water connection
12, 13 Coffee bean container (milling mechanism)
14 Outlet
15 Operating/display unit
16 Standing area
17 Container (e.g., cup)
18 Housing
19 Main water valve
20 Cartridge holder
21 Cartridge
21a Decalcification cartridge
21b Filter cartridge
22 Water pump
23 Switching device
24 Hydraulic part 25 Controller
26 Interior space (cartridge)
27 Cartridge connection (inlet end)
28 Cartridge connection (outlet end)
29 Actuating element
30 Switch element
31 Coding element
32 Query device (optical, high-frequency technical, magnetic, etc.)
33 pH sensor
34a, b Cartridge
35 Cartridge connection (inlet end)
36 Cartridge connection (outlet end)
37, 38 Non-return valve
39 Actuating element
40 Non-return valve
EM Decalcifying agent
F Filter

The invention claimed is:

1. An automatic beverage machine which by supplying water to a hydraulic component situated in the automatic beverage machine via a fixed water connection prepares a beverage and dispenses said beverage at an outlet of the automatic beverage machine, wherein an externally accessible cartridge holder is provided on the automatic beverage machine, into which a cartridge may be replaceably inserted, the cartridge having a cartridge connection on a feed side and a cartridge connection on a discharge side, via which water is supplied to the automatic beverage machine via the fixed water connection flows through the cartridge, in an inserted state of the cartridge and is thereby filtered and/or enriched with additives; wherein the cartridge holder includes a switching device that is switchable between a first position wherein the fixed water connection is fluidly connected to the hydraulic component when a cartridge is not inserted, and a second position wherein fluid from the fixed water connection is partially or completely diverted through a bypass line and through the cartridge when the cartridge is inserted.

2. The automatic beverage machine according to claim 1, wherein a water pump is provided in the automatic beverage machine between the fixed water connection and the hydraulic component, and that the cartridge holder is designed so that water pumped by the water pump to the hydraulic component flows through the inserted cartridge.

3. The automatic beverage machine according to claim 1, wherein cartridges having different functions and/or sizes are insertable into the cartridge holder.

4. The automatic beverage machine according to claim 3, wherein the cartridges are each provided with a coding element, which is characteristic for the particular functionality and size of the cartridge.

5. The automatic beverage machine according to claim 4, wherein the coding elements are designed to be read or read out by mechanical, optical, high-frequency, or magnetic means.

6. The automatic beverage machine according to claim 5, wherein the coding elements are designed as RFIDs.

7. The automatic beverage machine according to claim 5, wherein the coding elements include a one- or two-dimensional optical code.

8. The automatic beverage machine according to claim 5, wherein means for reading or reading out the coding elements affixed to the cartridges are provided on the automatic beverage machine, and that the means for reading or reading out the coding elements affixed to the cartridges are connected to a controller of the automatic beverage machine.

9. The automatic beverage machine according to claim 8, wherein the means for reading or reading out the coding elements affixed to the cartridges are situated on the cartridge holder.

10. The automatic beverage machine according to claim 1, wherein the cartridges are designed as descaling cartridges and have an inner chamber in which descaling agent (EM) is accommodated.

11. The beverage machine according to claim 1, wherein the cartridges are designed as filter cartridges and have an inner chamber in which a filter (F) for the water flowing through it is accommodated.

12. The automatic beverage machine according to claim 1, wherein the switching element that is situated in the cartridge holder is connected to a controller of the automatic beverage machine and is activated automatically on insertion of a cartridge.

13. The automatic beverage machine according to claim 1, wherein the cartridges may be inserted into the cartridge holder in a lockable or latchable manner.

14. The automatic beverage machine according to claim 1, wherein means for monitoring the water quality are provided, said means being connected to a controller of the automatic beverage machine.

15. A method for operating an automatic beverage machine according to claim 1, wherein upon insertion of the cartridge into the cartridge holder, the water coming from the fixed water connection is automatically diverted partially or entirely into the cartridge, and upon removal of the cartridge the water is not diverted partially or entirely into the cartridge.

16. The method according to claim 15, wherein the insertion of the cartridge into the cartridge holder is automatically signaled to a controller of the automatic beverage machine, and the inserted cartridge is displayed visually on the automatic beverage machine.

17. The method according to claim 16, wherein the type of cartridge inserted is detected automatically, and a descaling program is initiated automatically and carried out when the cartridge inserted is a descaling cartridge.

18. The method according to claim 15, wherein a scaling level of the hydraulic component is monitored continuously and is displayed on the automatic beverage machine when a descaling program is necessary or when a descaling cartridge should be inserted into the cartridge holder.

19. The method according to claim 15, wherein during normal operation of the automatic beverage machine, a filter cartridge is inserted into the cartridge holder, and the filter cartridge is replaced by a descaling cartridge when there is a need for descaling.

20. The automatic beverage machine according to claim 1, wherein the cartridge is provided with a check valve on each of the feed side and the discharge side and the check valves are configured to be opened for carrying out a descaling operation.

21. The automatic beverage machine according to claim 20, wherein the check valve on the feed side is configured to be fluidly opened by the water that is present on the feed side.

22. The automatic beverage machine according to claim 20, wherein the check valve on the discharge side is configured to be fluidly opened by the water flowing through the cartridge.

23. The automatic beverage machine according to claim 20, wherein the check valve on the discharge side is configured to be mechanically opened by an actuating element that engages from outside the cartridge.

* * * * *